(12) United States Patent
Cho et al.

(10) Patent No.: US 8,898,429 B2
(45) Date of Patent: Nov. 25, 2014

(54) APPLICATION PROCESSOR AND A COMPUTING SYSTEM HAVING THE SAME

(75) Inventors: Kyong-Ho Cho, Seoul (KR); Il-Ho Lee, Yongin-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 335 days.

(21) Appl. No.: 13/530,623

(22) Filed: Jun. 22, 2012

(65) Prior Publication Data
US 2013/0173883 A1    Jul. 4, 2013

(30) Foreign Application Priority Data

Dec. 29, 2011   (KR) ........................ 10-2011-0145426

(51) Int. Cl.
*G06F 12/00* (2006.01)
(52) U.S. Cl.
USPC ................ 711/207; 711/206; 710/22; 710/26
(58) Field of Classification Search
None
See application file for complete search history.

(56) References Cited

U.S. PATENT DOCUMENTS

| | | | |
|---|---|---|---|
| 7,406,613 | B2 | 7/2008 | Dieffenderfer et al. |
| 2003/0093625 | A1* | 5/2003 | Beukema et al. ............. 711/147 |
| 2007/0168644 | A1* | 7/2007 | Hummel et al. ............. 711/207 |
| 2010/0161850 | A1 | 6/2010 | Otsuka |
| 2011/0161620 | A1* | 6/2011 | Kaminski et al. ............. 711/207 |
| 2013/0086285 | A1* | 4/2013 | Ye et al. ......................... 710/26 |

FOREIGN PATENT DOCUMENTS

| | | |
|---|---|---|
| JP | 09-282233 A | 10/1997 |
| JP | 2010-152527 A | 7/2010 |
| KR | 10-0354274 B1 | 12/2002 |

OTHER PUBLICATIONS

"Effective Virtual Memory Management Method for an IO Device using IOMMU", Sep. 7, 2011.

* cited by examiner

*Primary Examiner* — Matthew Bradley
*Assistant Examiner* — Daniel Tsui
(74) *Attorney, Agent, or Firm* — Harness, Dickey & Pierce, P.L.C.

(57) ABSTRACT

An application processor includes a system memory unit, peripheral devices, a control unit and a central processing unit (CPU). The system memory unit includes one page table. The peripheral devices share the page table and perform a DMA (Direct Memory Access) operation on the system memory unit using the page table, where each of the peripheral devices includes a memory management unit having a translation lookaside buffer. The control unit divides a total virtual address space corresponding to the page table into sub virtual address spaces, assigns the sub virtual address spaces to the peripheral devices, respectively, allocates and releases a DMA buffer in the system memory unit, and updates the page table, where at least two of the sub virtual address spaces have different sizes from each other. The CPU controls the peripheral devices and the control unit. The application processor reduces memory consumption.

19 Claims, 10 Drawing Sheets

FIG. 3
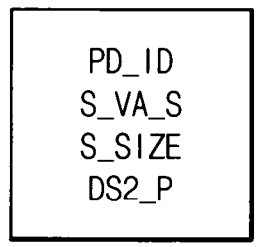
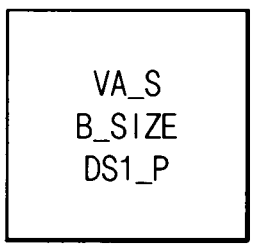

VA_S
B_SIZE
A_BM
DS1_P

A_BM

| 1 | 1 | 0 | 0 | 1 | 0 |

APPLICATION PROCESSOR AND A COMPUTING SYSTEM HAVING THE SAME

CROSS-REFERENCE TO RELATED APPLICATION(S)

This application claims priority under 35 USC to Korean Patent Application No. 10-2011-0145426, filed on Dec. 29, 2011 in the Korean Intellectual Property Office (KIPO), the contents of which are herein incorporated by reference in their entirety.

BACKGROUND

1. Technical Field

Example embodiments relate to an application processor and a computing system including the application processor.

2. Description of the Related Art

Generally, an application processor includes peripheral devices such as an image processor, a three dimensional graphic processor, a movie encoder, a movie decoder, etc., to reduce burden of a central processing unit (CPU) in processing multimedia data. The peripheral devices perform a direct memory access (DMA) operation on a system memory in which the peripheral devices directly write data to the system memory and directly read data from the system memory without intervention of the central processing unit.

Conventionally, the peripheral devices included in an application processor access a physical memory (i.e., the system memory) using a physical address of the physical memory. As a size of multimedia data increases, a size of continuous memory that is required for the DMA operation increases, so that it is hard for the peripheral devices to get a large size of continuous physical memory during operation.

Therefore, peripheral devices included in a recent application processor includes a memory management unit (MMU) that translates continuous virtual addresses into physical addresses using a page table and accesses the physical memory using the translated physical addresses. As such, a large size of continuous physical memory is no longer required for the DMA operation.

However, since each peripheral device includes a MMU, a plurality of page tables, which correspond to the peripheral devices, respectively, are stored in the system memory, so that memory consumption increases.

SUMMARY

Some example embodiments are directed to provide an application processor that reduces memory consumption without degrading an operation speed.

Some example embodiments are directed to provide a computing system including the application processor.

According to at least one example embodiment, an application processor includes a system memory unit, a plurality of peripheral devices, a control unit and a central processing unit. The system memory unit includes one page table. The plurality of peripheral devices share the page table and perform a write operation and a read operation on the system memory unit using the page table, where each of the plurality of peripheral devices includes a memory management unit (MMU) having a translation lookaside buffer (TLB) that stores a virtual address and a physical address corresponding to the virtual address. The control unit divides a total virtual address space corresponding to the page table into a plurality of sub virtual address spaces, assigns the plurality of sub virtual address spaces to the plurality of peripheral devices, respectively, allocates a DMA (Direct Memory Access) buffer in the system memory unit, releases the DMA buffer from the system memory unit, and updates the page table, where at least two of the plurality of sub virtual address spaces have different sizes from each other. The central processing unit controls the plurality of peripheral devices and the control unit.

In example embodiments, when the control unit deletes an entry of the page table, the control unit may provide an invalidation signal only to a peripheral device, which is assigned to a sub virtual address space that includes a virtual address corresponding to the deleted entry, among the plurality of peripheral devices. The memory management unit included in the peripheral device that receives the invalidation signal from the control unit may invalidate the corresponding translation lookaside buffer.

In example embodiments, the control unit may store start addresses and sizes of the plurality of sub virtual address spaces along with corresponding device identifications (IDs) of the plurality of peripheral devices assigned to the plurality of sub virtual address spaces, respectively.

In example embodiments, when the control unit receives a buffer allocation control signal including a device ID and a buffer size from the central processing unit, the control unit may allocate a buffer space of the buffer size in a sub virtual address space assigned to a peripheral device of the device ID, allocate a DMA buffer of the buffer size in the system memory unit, generate a data structure that is related to the DMA buffer and store a start address of the buffer space and the buffer size, update an entry of the page table corresponding to the buffer space with a physical address of the DMA buffer, and provide the start address of the buffer space to the central processing unit.

The control unit may provide a buffer allocation fail signal to the central processing unit when a maximum address space that is continuous and is not allocated as the buffer space in the sub virtual address space assigned to the peripheral device of the device ID is smaller than the buffer size.

When the control unit receives a buffer release control signal including a start address from the central processing unit, the control unit may detect a data structure that stores the start address included in the buffer release control signal, release a DMA buffer related to the detected data structure from the system memory unit, delete an entry of the page table corresponding to the detected data structure, provide an invalidation signal to a peripheral device, which is assigned to a sub virtual address space that includes a virtual address corresponding to the detected data structure, among the plurality of peripheral devices, and delete the detected data structure.

The memory management unit included in the peripheral device that receives the invalidation signal from the control unit may invalidate the corresponding translation lookaside buffer.

The data structure may further store an access bitmap, where bits of the access bitmap corresponds to the plurality of peripheral devices, respectively, and each bit of the access bitmap represents whether a corresponding peripheral device accessed a DMA buffer related to the data structure at least one time. The control unit may initially set all bits of the access bitmap as a first value when the control unit generates the data structure.

When the control unit receives a buffer share control signal including a device ID and a start address from the central processing unit, the control unit may detect a data structure that stores the start address included in the buffer share control signal, and if a bit corresponding to a peripheral device of the device ID among bits of the access bitmap that is stored in the detected data structure has the first value, the control unit may change the bit to a second value and provide an invalidation signal to the peripheral device of the device ID.

In example embodiments, when each of the plurality of peripheral devices receives a first operation control signal including a start address and a buffer size from the central processing unit, the memory management unit included in each of the plurality of peripheral devices may translate virtual addresses, which starts from the start address included in the first operation control signal and has a size of the buffer size included in the first operation control signal, into physical addresses using the corresponding translation lookaside buffer and the page table and perform the write operation and the read operation on a DMA buffer corresponding to the physical addresses.

Each of the plurality of peripheral devices may further include a register storing a start address and a size of a corresponding sub virtual address space.

Each of the plurality of peripheral devices may receive the start address and the size of the corresponding sub virtual address space from the control unit at a boot time, and store the start address and the size of the corresponding sub virtual address space to the register.

Each of the plurality of peripheral devices may determine whether the virtual addresses, which starts from the start address included in the first operation control signal and has a size of the buffer size included in the first operation control signal, exceeds the corresponding sub virtual address space using the register, and provide an operation fail signal to the central processing unit without performing the write operation and the read operation if the virtual addresses exceeds the corresponding sub virtual address space.

When each of the plurality of peripheral devices receives a second operation control signal including a start address and a buffer size from the central processing unit, the memory management unit included in each of the plurality of peripheral devices may translate virtual addresses, which starts from the start address included in the second operation control signal and has a size of the buffer size included in the second operation control signal, into physical addresses using the corresponding translation lookaside buffer and the page table and perform the write operation and the read operation on a DMA buffer corresponding to the physical addresses regardless of whether the virtual addresses exceed the corresponding sub virtual address space.

According to at least one example embodiment, a computing system includes a storage device, an application processor and a display device. The storage device stores multimedia data. The application processor translates the multimedia data into output data. The display device displays the output data. The application processor includes a system memory unit, a plurality of peripheral devices, a control unit and a central processing unit. The system memory unit includes one page table. The plurality of peripheral devices share the page table and perform a write operation and a read operation on the system memory unit using the page table, where each of the plurality of peripheral devices includes a memory management unit (MMU) having a translation lookaside buffer (TLB) that stores a virtual address and a physical address corresponding to the virtual address. The control unit divides a total virtual address space corresponding to the page table into a plurality of sub virtual address spaces, assigns the plurality of sub virtual address spaces to the plurality of peripheral devices, respectively, allocates a DMA (Direct Memory Access) buffer in the system memory unit, releases the DMA buffer from the system memory unit, and updates the page table, where at least two of the plurality of sub virtual address spaces have different sizes from each other. The central processing unit controls the plurality of peripheral devices and the control unit.

According to at least one example embodiment, an application processor may include a system memory unit including one page table, the page table storing virtual addresses each corresponding to physical addresses of memory in the system memory unit; a plurality of peripheral devices configured to share the page table; a control unit configured to divide a total virtual address space corresponding to the page table into a plurality of sub virtual address spaces, and to assign the plurality of sub virtual address spaces to the plurality of peripheral devices, respectively; and a central processing unit configured to control the plurality of peripheral devices and the control unit. The control unit my be configured to receive buffer allocation commands corresponding to the plurality of peripheral devices from the central processing unit, allocate buffer spaces for the peripheral devices in the system memory unit based on the buffer allocation commands in accordance with the sub virtual address spaces corresponding, respectively, to the peripheral devices, update the page table to reflect the allocated buffer spaces, and provide virtual start addresses corresponding to each of the allocated spaces to the control unit. The peripheral memory devices may be configured receive corresponding ones of the virtual start addresses from the central processing unit and to perform a memory read or write operations on the system memory unit based on the virtual start addresses and the page table.

Each of the plurality of peripheral devices may include a memory management unit (MMU) having a translation lookaside buffer (TLB) configured to translate the virtual start address into a physical addresses of the system memory unit.

The control unit may be configured to divide the total virtual address space such that at least two of the plurality of sub virtual address spaces have different sizes from each other.

The control unit may be further configured to receive buffer release commands from the central processing unit, the buffer release commands indicating peripheral devices from among the plurality of peripheral devices, and to release spaces from among the buffer spaces allocated to the indicated peripheral devices based on the buffer release commands by sending invalidation commands to the TLBs of the indicated peripheral devices.

BRIEF DESCRIPTION OF THE DRAWINGS

Illustrative, non-limiting example embodiments will be more clearly understood from the following detailed description in conjunction with the accompanying drawings.

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

FIGS. 2 and 3 are diagrams for describing an operation of a control unit included in an application processor of FIG. 1.

FIG. 8 is a diagram for describing an operation of a control unit included in an application processor of FIG. 7.

DETAILED DESCRIPTION OF THE EMBODIMENTS

Figure 1:
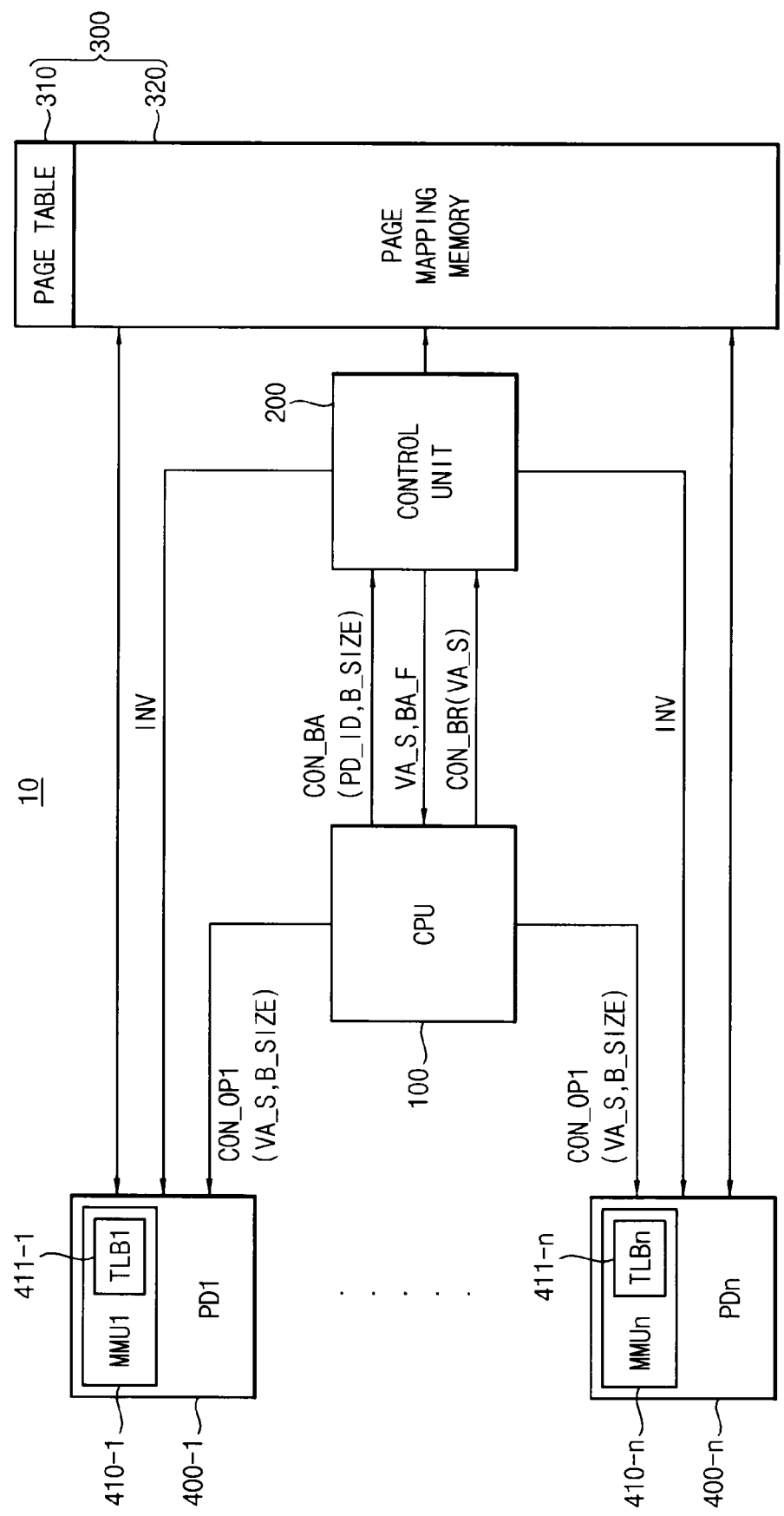
FIG. 1 is a block diagram illustrating an application processor according to at least one example embodiment.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a block diagram illustrating an application processor according to at least one example embodiment.

Referring to FIG. 1, an application processor 10 includes a central processing unit (CPU) 100, a control unit 200, a system memory unit 300, and a plurality of peripheral devices 400-1~400-$n$ (N is a positive integer).

The system memory unit 300 includes one page table 310 and a page mapping memory 320. The page table 310 is stored in a fixed address of the system memory unit 300. The page mapping memory 320 represents a physical memory used by the plurality of peripheral devices 400-1~400-$n$. The page table 310 includes a plurality of entries, each of which stores a virtual address and a physical address corresponding to the virtual address by a unit of page.

The plurality of peripheral devices 400-1~400-$n$ share the page table 310 and perform a write operation and a read operation on the page mapping memory 320 using the page table 310. Each of the plurality of peripheral devices 400-1~400-$n$ includes a memory management unit (MMU), and each memory management unit includes a translation lookaside buffer (TLB) that stores virtual addresses and physical addresses corresponding to the virtual addresses. For example, the first peripheral device PD1 400-1 includes a memory management unit MMU1 410-1 having a translation lookaside buffer TLB1 411-1, and the n-th peripheral device PDn 400-$n$ includes a memory management unit MMUn 410-$n$ having a translation lookaside buffer TLBn 411-$n$. Each memory management unit 410-1~410-$n$ translates virtual addresses into physical addresses using the corresponding translation lookaside buffer 411-1~411-$n$ and the page table 310 and performs the write operation and the read operation on the page mapping memory 320 using the translated physical addresses. The plurality of peripheral devices 400-1~400-$n$ may include an image processor, a three dimensional graphic processor, a movie encoder, a movie decoder, etc.

The control unit 200 divides a total virtual address space corresponding to the page table 310 into a plurality of sub virtual address spaces, and assigns the plurality of sub virtual address spaces to the plurality of peripheral devices 400-1~400-$n$ unit respectively. Virtual address spaces required by the plurality of peripheral devices 400-1~400-$n$ may be different from each other according to tasks the plurality of peripheral devices 400-1~400-$n$ virtual address spaces, and assigns the plurality of sub virtualsub virtual address spaces may have different sizes from each other. For example, the control unit 200 may divide the total virtual address space corresponding to the page table 310 into the plurality of sub virtual address spaces in consideration of the tasks the plurality of peripheral devices 400-1~400-$n$ perform, such that at least two of the plurality of sub virtual address spaces have different sizes from each other.

The control unit 200 allocates a DMA (Direct Memory Access) buffer in the page mapping memory 320 of the system memory unit 300 or releases the DMA buffer from the page mapping memory 320 of the system memory unit 300 in response to a command provided from the central processing unit 100. The control unit 200 updates the page table 310 when the control unit 200 allocates the DMA buffer and releases the DMA buffer.

The central processing unit 100 controls the plurality of peripheral devices 400-1~400-$n$ and the control unit 200.

Figure 2:
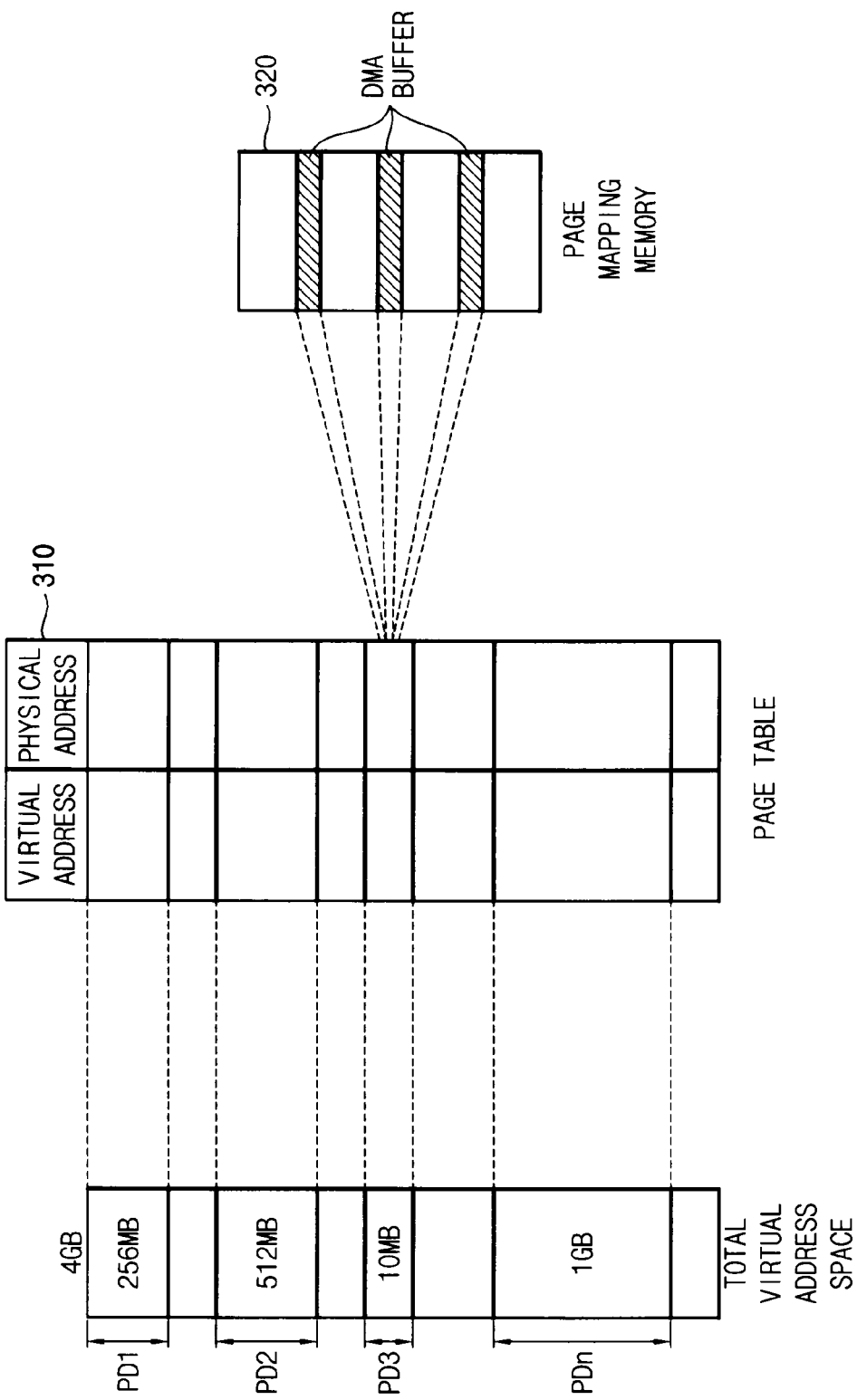

FIGS. 2 and 3 are diagrams for describing an operation of a control unit included in an application processor of FIG. 1.

FIG. 2 represents an exemplary operation of the control unit 200 when the total virtual address space corresponding to the page table 310 is 4 GB (giga byte).

The control unit 200 may divide the total virtual address space corresponding to the page table 310 into the plurality of sub virtual address spaces at a boot time of the application processor 10.

Referring to FIG. 2, according to at least one example embodiment, the control unit 200 may assign a first sub virtual address space having a size of 256 MB (megabyte) to a first peripheral device PD1, assign a second sub virtual address space having a size of 512 MB (megabyte) to a second peripheral device PD2, assign a third sub virtual address space having a size of 10 MB (megabyte) to a third peripheral device PD3, and assign a fourth sub virtual address space having a size of 1 GB (giga byte) to a fourth peripheral device PD4.

The control unit 200 may internally store start addresses and sizes of the plurality of sub virtual address spaces along with corresponding device identifications (IDs) of the plurality of peripheral devices that are assigned to the plurality of sub virtual address spaces, respectively. For example, as illustrated in FIG. 3, the control unit 200 may generate a first data structure DS1 for each of the plurality of peripheral devices 400-1~400-n and store a start address S_VA_S and a size S_SIZE of a corresponding sub virtual address space along with a device ID PD_ID of a corresponding peripheral device in the first data structure DS1. As will be described later, the first data structure DS1 may further store a first pointer DS2_P that indicates a second data structure DS2 related to a DMA buffer that is allocated for the corresponding peripheral device.

Figure 4:
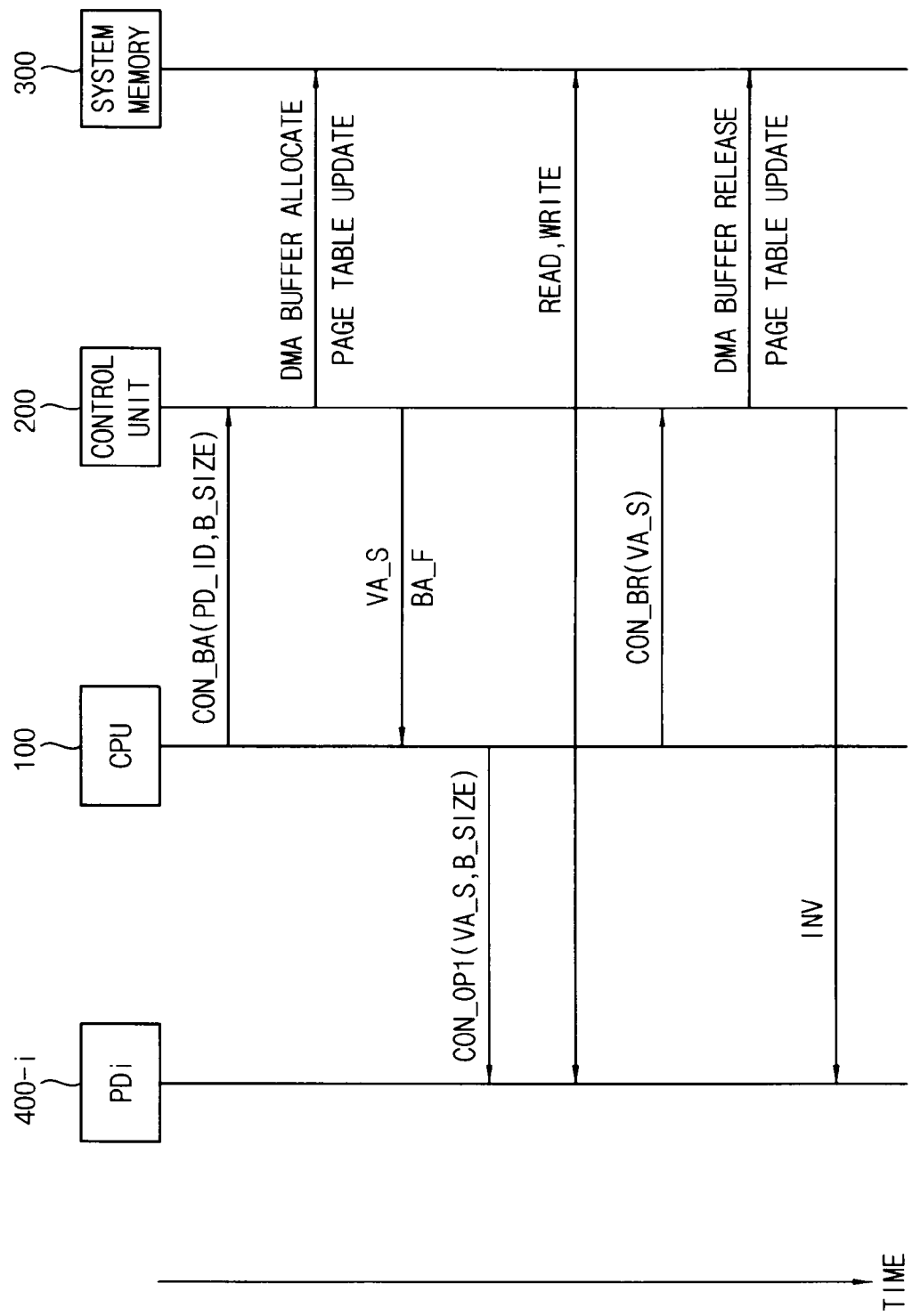
FIG. 4 is a diagram for describing an operation of an application processor of FIG. 1.

FIG. 4 is a diagram for describing an operation of an application processor of FIG. 1.

Hereinafter, an operation of the application processor 10 will be described with reference to FIGS. 1 to 4.

The plurality of peripheral devices 400-1~400-n n performs a direct memory access (DMA) operation on the system memory unit 300 in response to a command provided from the central processing unit 100 in which the plurality of peripheral devices 400-1~400-n directly write data to the page mapping memory 320 of the system memory unit 300 and directly read data from the page mapping memory 320 of the system memory unit 300 without intervention of the central processing unit 100.

In FIG. 4, the central processing unit CPU 100 commands the peripheral device PDi 400-i (i is a positive integer equal to or smaller than N) to perform a DMA operation on the system memory unit 300 in which the peripheral device 400-i directly writes data to the system memory unit 300 and directly reads data from the system memory unit 300 without intervention of the central processing unit 100.

Referring to FIG. 4, the central processing unit CPU 100 may provide the control unit 200 with a buffer allocation control signal CON_BA that includes a device ID PD_ID of the peripheral device 400-i and a buffer size B_SIZE. The buffer size B_SIZE may represent a size of memory that is required for the peripheral device 400-i to perform the DMA operation.

When the control unit 200 receives the buffer allocation control signal CON_BA including the device ID PD_ID and the buffer size B_SIZE from the central processing unit 100, the control unit 200 may allocate a buffer space having a size of the buffer size B_SIZE in a sub virtual address space that is assigned to the peripheral device 400-i of the device ID PD_ID. In addition, as illustrated in FIG. 2, the control unit 200 may allocate a DMA buffer having a size of the buffer size B_SIZE in the page mapping memory 320 by combining free spaces, which are not currently allocated as the DMA buffer, in the page mapping memory 320. In addition, the control unit 200 may generate a second data structure DS2, as illustrated in FIG. 3, and store a start address VA_S of the allocated buffer space and the buffer size B_SIZE in the generated second data structure DS2. The control unit 200 may detect a first data structure DS1 that stores the device ID PD_ID included in the buffer allocation control signal CON_BA, store a pointer indicating the detected first data structure DS1 in the second data structure DS2 as a second pointer DS1_P, and store a pointer indicating the generated second data structure DS2 in the detected first data structure DS1 as the first pointer DS2_P. As such, the detected first data structure DS1 and the generated second data structure DS2 may be correlated with each other.

A plurality of DMA buffers may be allocated for one peripheral device, such that a plurality of second data structures DS2 may be generated for the one peripheral device. In this case, the first data structure DS1 corresponding to the one peripheral device may store all the first pointers DS2_P indicating the plurality of second data structures DS2.

In addition, as illustrated in FIG. 2, the control unit 200 may update an entry of the page table 310 that corresponds to the allocated buffer space with a physical address of the allocated DMA buffer. As such, the generated second data structure DS2 storing the start address VA_S of the allocated buffer space and the buffer size B_SIZE may be related to the allocated DMA buffer.

The control unit 200 may provide the start address VA_S of the allocated buffer space to the central processing unit 100.

In some example embodiments, when the control unit 200 receives the buffer allocation control signal CON_BA including the device ID PD_ID and the buffer size B_SIZE from the central processing unit 100, the control unit 200 may determine whether a maximum address space that is continuous and is not allocated as the buffer space in a sub virtual address space assigned to the peripheral device 400-i of the device ID PD_ID is smaller than the buffer size B_SIZE. If the maximum address space is smaller than the buffer size B_SIZE, the control unit 200 may provide a buffer allocation fail signal BA_F to the central processing unit 100 without allocating a DMA buffer in the page mapping memory 320.

Figure 5:
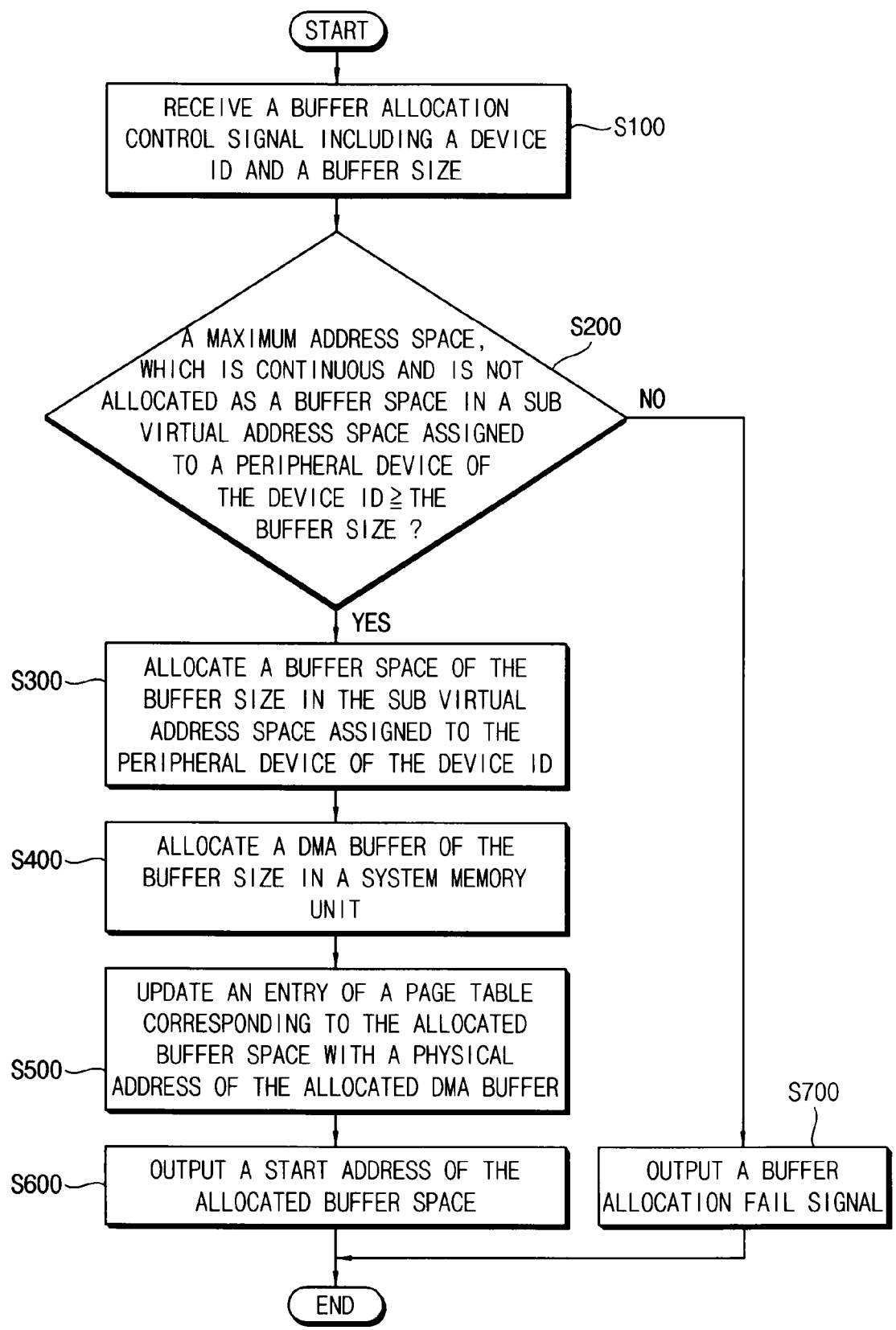
FIG. 5 is a flow chart for describing an operation of allocating a DMA buffer performed by a control unit included in an application processor of FIG. 1.

FIG. 5 is a flow chart for describing an operation of allocating a DMA buffer performed by a control unit included in an application processor of FIG. 1.

Referring to FIG. 5, the control unit 200 receives a buffer allocation control signal CON_BA including a device ID PD_ID and a buffer size B_SIZE from the central processing unit 100 (S100).

The control unit 200 determines whether a maximum address space that is continuous and is not allocated as the buffer space in a sub virtual address space assigned to a peripheral device of the device ID PD_ID is smaller than the buffer size B_SIZE (S200).

If the maximum address space is equal to or larger than the buffer size B_SIZE, the control unit 200 allocates a buffer space having a size of the buffer size B_SIZE in the sub virtual address space that is assigned to the peripheral device of the device ID PD_ID (S300). The control unit 200 allocates a DMA buffer having a size of the buffer size B_SIZE in the page mapping memory 320 by combining free spaces, which are not currently allocated as the DMA buffer, in the page mapping memory 320 (S400). The control unit 200 updates an entry of the page table 310 that corresponds to the allocated buffer space with a physical address of the allocated DMA buffer (S500). The control unit 200 provides a start address VA_S of the allocated buffer space to the central processing unit 100 (S600).

On the other hand, if the maximum address space is smaller than the buffer size B_SIZE, the control unit 200 provides the buffer allocation fail signal BA_F to the central processing unit 100 without allocating a DMA buffer in the page mapping memory 320 (S700).

The operation of allocating a DMA buffer performed by the control unit 200 of FIG. 5 is described above with reference to FIGS. 1 to 4. Therefore, a detailed description of steps in FIG. 5 will be omitted.

Referring again to FIG. 4, when the central processing unit 100 receives the start address VA_S of the allocated buffer space from the control unit 200, the central processing unit 100 may provide the peripheral device 400-$i$ of the device ID PD_ID with a first operation control signal CON_OP1 that includes the start address VA_S of the allocated buffer space that is received from the control unit 200 and the buffer size B_SIZE that represents a size of the allocated buffer space.

When the peripheral device 400-$i$ receives the first operation control signal CON_OP1 including the start address VA_S of the allocated buffer space and the buffer size B_SIZE from the central processing unit 100, the memory management unit 410-$i$ included in the peripheral device 400-$i$ may perform a DMA operation on the system memory unit 300 using a virtual address space, which starts from the start address VA_S included in the first operation control signal CON_OP1 and has a size of the buffer size B_SIZE included in the first operation control signal CON_OP1. The virtual address space equals to the allocated buffer space. That is, the memory management unit 410-$i$ included in the peripheral device 400-$i$ may translate virtual addresses included in the virtual address space (that is, the allocated buffer space) into physical addresses using the corresponding translation lookaside buffer 411-$i$ and the page table 310, and performs a write operation and a read operation on a DMA buffer corresponding to the translated physical addresses. The method of translating the virtual addresses into the physical addresses using the corresponding translation lookaside buffer 411-$i$ and the page table 310 may be implemented in various ways.

When the peripheral device 400-$i$ completes the DMA operation, the central processing unit 100 may provide the control unit 200 with a buffer release control signal CON_BR that includes the start address VA_S of the allocated buffer space corresponding to the DMA buffer on which the peripheral device 400-$i$ performed the DMA operation. The start address VA_S included in the buffer release control signal CON_BR may be the same as the start address VA_S included in the first operation control signal CON_OP1.

When the control unit 200 receives the buffer release control signal CON_BR including the start address VA_S from the central processing unit 100, the control unit 200 may detect a second data structure DS2 that stores the start address VA_S included in the buffer release control signal CON_BR, and release a DMA buffer related to the detected second data structure DS2 from the page mapping memory 320. In addition, the control unit may delete an entry of the page table 310 that corresponds to the detected second data structure DS2. And then, the control unit 200 may provide an invalidation signal INV to the peripheral device 400-$i$, which is assigned to a sub virtual address space that includes a virtual address corresponding to the detected second data structure DS2, among the plurality of peripheral devices 400-1~400-$n$. For example, the control unit 200 may detect a first data structure DS1 that is indicated by a second pointer DS1_P stored in the detected second data structure DS2, and provide the invalidation signal INV to a peripheral device corresponding to a device ID stored in the detected first structure DS1. And then, the control unit 200 may delete the detected second data structure DS2.

The memory management unit 410-$i$ included in the peripheral device 400-$i$ that receives the invalidation signal INV from the control unit 200 may invalidate all entries of the corresponding translation lookaside buffer 411-$i$.

As described above, the application processor 10 according to at least one example embodiment includes only one page table 310 in the system memory unit 300, and the plurality of peripheral devices 400-1~400-$n$ included in the application processor 10 share the one page table 310 to perform a DMA operation. Therefore, the application processor 10 may reduce system memory consumption for storing page tables.

In addition, when the control unit 200 deletes an entry of the page table 310, the control unit 200 may provide the invalidation signal INV only to a peripheral device, which is assigned to a sub virtual address space that includes a virtual address corresponding to the deleted entry, among the plurality of peripheral devices 400-1~400-$n$, and the memory management unit included in the peripheral device that receives the invalidation signal INV from the control unit 200 may invalidate all the entries of the corresponding translation lookaside buffer. The peripheral device that does not receive the invalidation signal INV from the control unit 200 may not invalidate the corresponding translation lookaside buffer. Therefore, an operation speed of the application processor 10 may not be degraded even if the plurality of peripheral devices 400-1~400-$n$ included in the application processor 10 share the one page table 310 since the peripheral device that does not receive the invalidation signal INV from the control unit 200 may maintain information stored in the corresponding translation lookaside buffer after an entry of the page table 310 is deleted.

Figure 6:
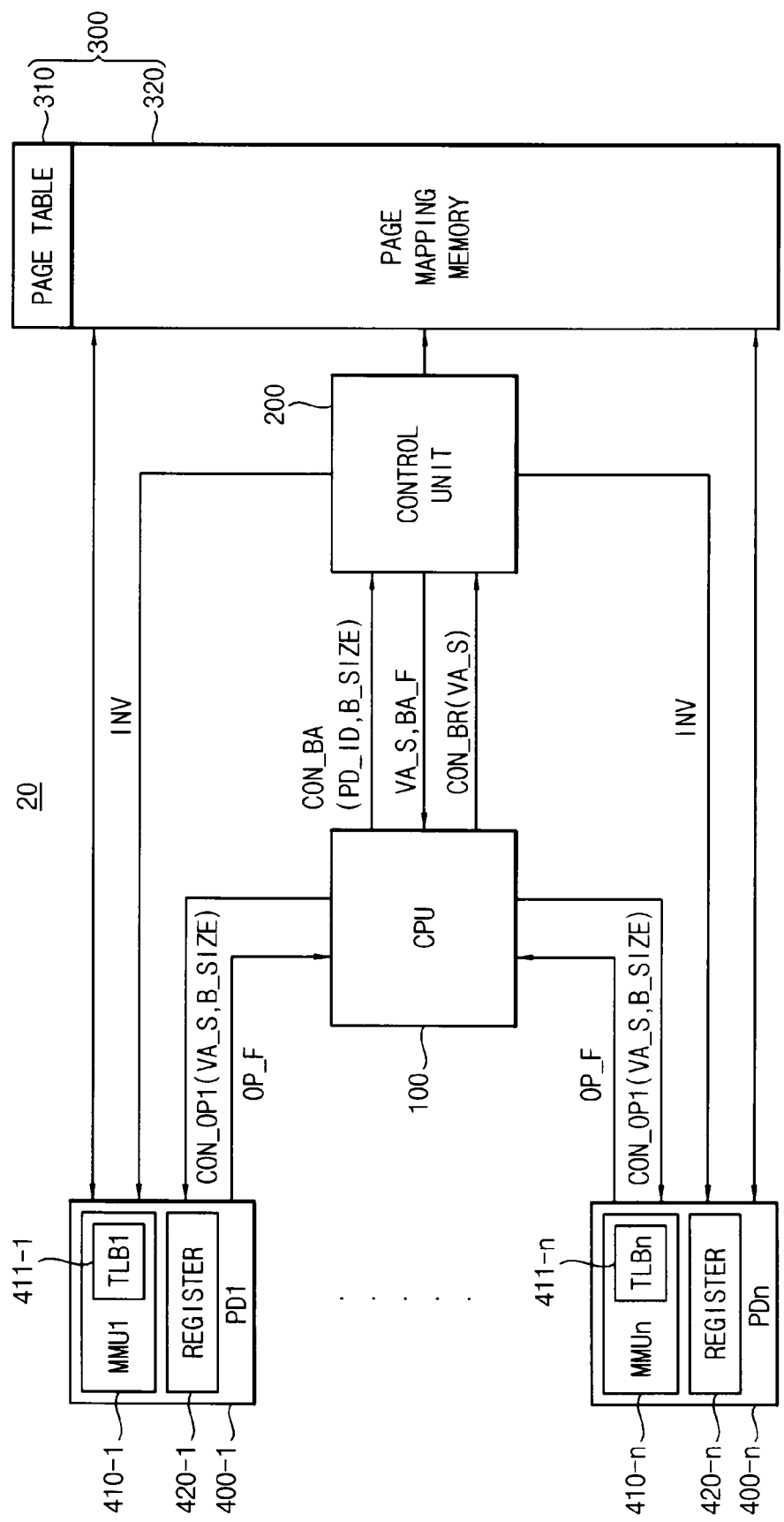
FIG. 6 is a block diagram illustrating an application processor according to at least one example embodiment.

FIG. 6 is a block diagram illustrating an application processor according to at least one example embodiment.

Referring to FIG. 6, an application processor 20 includes a central processing unit (CPU) 100, a control unit 200, a system memory unit 300, and a plurality of peripheral devices 400-1~400-$n$ (N is a positive integer).

Comparing the application processor 20 of FIG. 6 with the application processor 10 of FIG. 1, the plurality of peripheral devices 400-1~400-$n$ included in the application processor 20 further include register units 420-1~420-$n$, respectively. A structure and an operation of the application processor 10 of FIG. 1 are described above with reference to FIGS. 1 to 5. Therefore, duplicated description will be omitted here.

Each of the plurality of peripheral devices 400-1~400-$n$ may store the start address S_VA_S and the size S_SIZE of a corresponding sub virtual address space in the register units 420-1~420-$n$, respectively. For example, at a boot time of the application processor 20, the control unit 200 may divide the total virtual address space corresponding to the page table 310 into the plurality of sub virtual address spaces, assign the plurality of sub virtual address spaces to the plurality of peripheral devices 400-1~400-$n$, respectively, and provide the start address S_VA_S and the size S_SIZE of the corresponding sub virtual address space to the plurality of peripheral devices 400-1~400-$n$. The plurality of peripheral devices 400-1~400-$n$ may store the start address S_VA_S and the size S_SIZE of the corresponding sub virtual address space received from the control unit 200 at the boot time of the application processor 20 to the register units 420-1~420-$n$, respectively.

When the peripheral device 400-*i* receives the first operation control signal CON_OP1 including the start address VA_S of the allocated buffer space and the buffer size B_SIZE from the central processing unit 100, the memory management unit 410-*i* included in the peripheral device 400-*i* may determine whether the virtual addresses, which starts from the start address VA_S included in the first operation control signal CON_OP1 and has a size of the buffer size B_SIZE included in the first operation control signal CON_OP1, exceeds the corresponding sub virtual address space using the start address S_VA_S and the size S_SIZE stored in the register unit 420-*i*. If the virtual addresses, which starts from the start address VA_S included in the first operation control signal CON_OP1 and has a size of the buffer size B_SIZE included in the first operation control signal CON_OP1, does not exceed the corresponding sub virtual address space, the memory management unit 410-*i* included in the peripheral device 400-*i* may perform a DMA operation on the system memory unit 300 as described above with reference to FIGS. 1 to 5. If the virtual addresses, which starts from the start address VA_S included in the first operation control signal CON_OP1 and has a size of the buffer size B_SIZE included in the first operation control signal CON_OP1, exceeds the corresponding sub virtual address space, the peripheral device 400-*i* may provide an operation fail signal OP_F to the central processing unit 100 as an interrupt signal without performing the DMA operation.

As described above, the plurality of peripheral devices 400-1~400-*n* included in the application processor 20 according to at least one example embodiment may provide the operation fail signal OP_F to the central processing unit 100 as an interrupt signal when the central processing unit 100 commands the plurality of peripheral devices 400-1~400-*n* to perform a DMA operation on a virtual address space that exceeds the respective sub virtual address space assigned at the boot time of the application processor 20. Therefore, reliability of the application processor 20 may increase.

Figure 7:
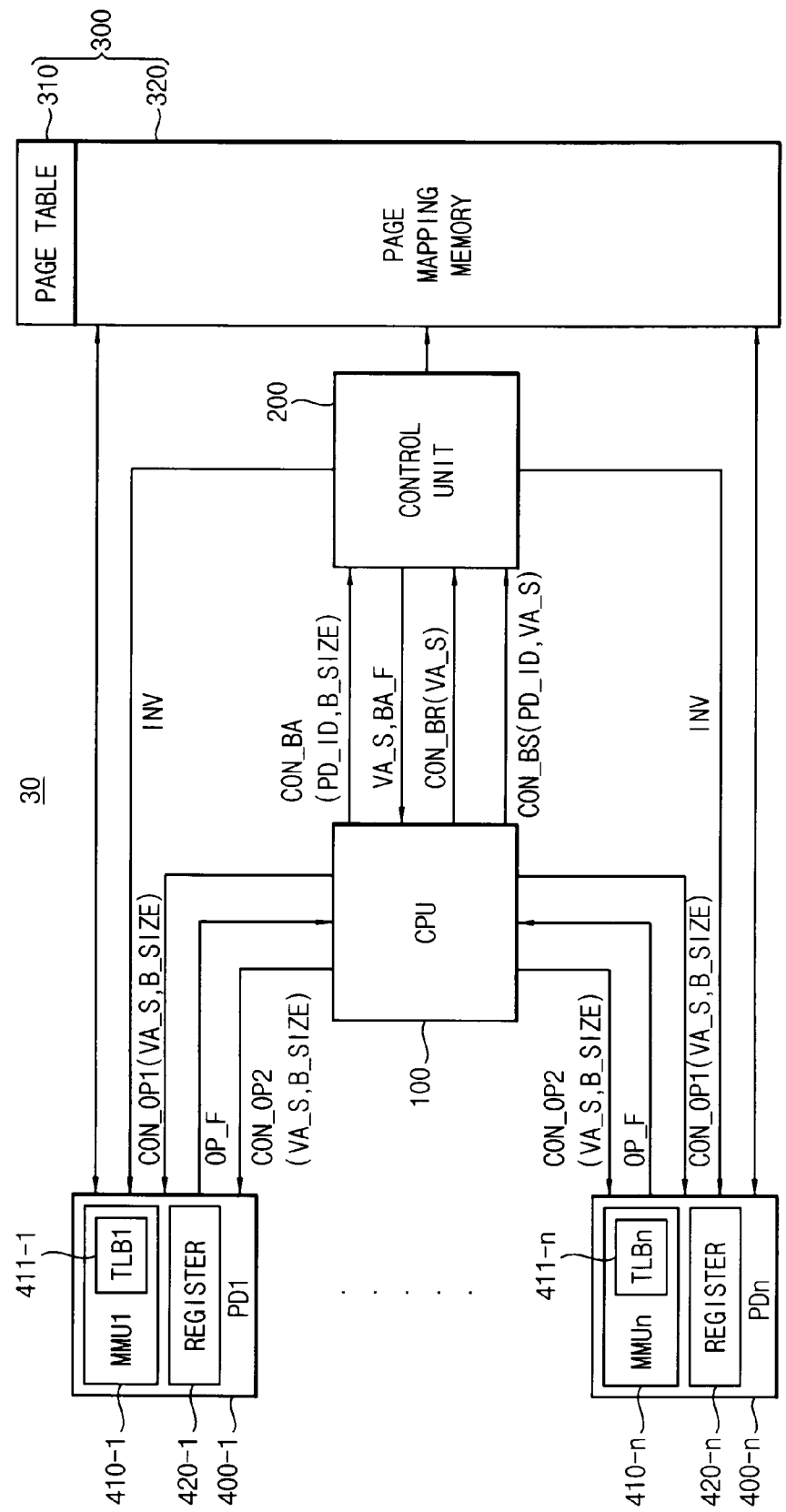
FIG. 7 is a block diagram illustrating an application processor according to at least one example embodiment.

FIG. 7 is a block diagram illustrating an application processor according to at least one example embodiment.

Referring to FIG. 7, an application processor 30 includes a central processing unit (CPU) 100, a control unit 200, a system memory unit 300, and a plurality of peripheral devices 400-1~400-*n* (N is a positive integer).

Comparing the application processor 30 of FIG. 7 with the application processor 20 of FIG. 6, the application processor 30 has the same structure and operation as the application processor 20 except that the application processor 30 allows the plurality of peripheral devices 400-1~400-*n* to share the sub virtual address spaces that are assigned to other peripheral devices. A structure and an operation of the application processor 20 of FIG. 6 are described above with reference to FIGS. 1 to 6. Therefore, duplicated description will be omitted here.

Figure 8:
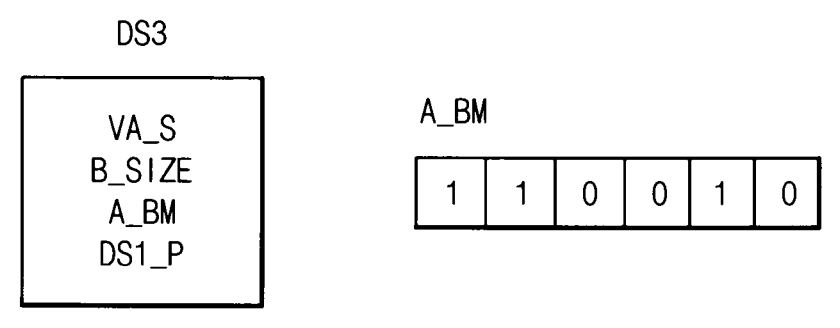
Figure 9:
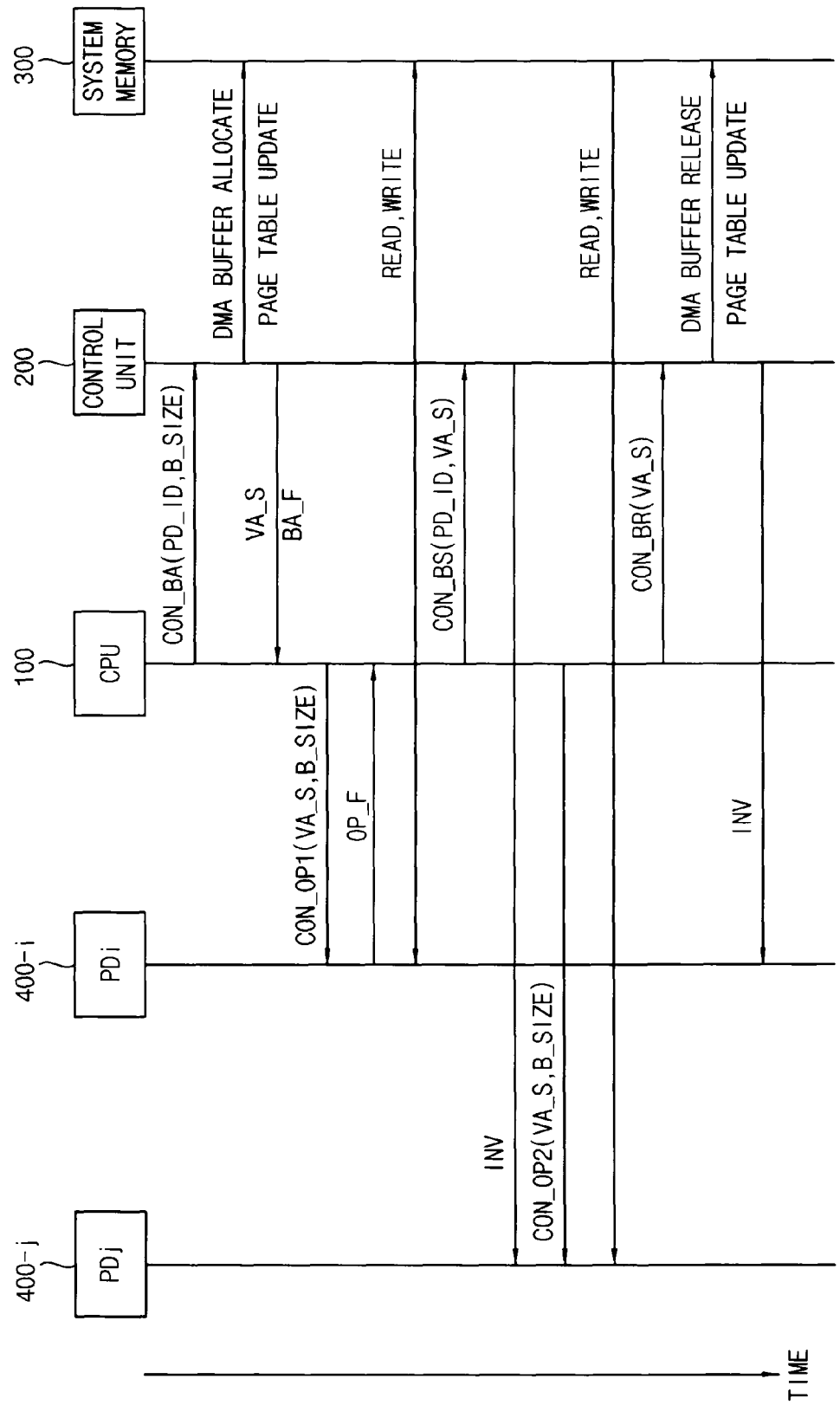
FIG. 9 is a diagram for describing an operation of an application processor of FIG. 7.

FIG. 8 is a diagram for describing an operation of a control unit included in an application processor of FIG. 7, and FIG. 9 is a diagram for describing an operation of an application processor of FIG. 7.

Hereinafter, an operation of the application processor 30 will be described with reference to FIGS. 7, 8 and 9.

In FIG. 9, the central processing unit CPU 100 commands the peripheral device PDi 400-*i* (I is a positive integer equal to or smaller than N) to perform a DMA operation on the system memory unit 300 in which the peripheral device 400-*i* directly writes data to the system memory unit 300 and directly reads data from the system memory unit 300 without intervention of the central processing unit 100. After that, the central processing unit CPU 100 commands the peripheral device PDj 400-*j* (J is a positive integer other than I and equal to or smaller than N) to perform a DMA operation on the system memory unit 300 using virtual addresses included in a sub virtual address space assigned to the peripheral device 400-*i*.

Referring to FIGS. 7 and 9, the central processing unit CPU 100 may provide the control unit 200 with the buffer allocation control signal CON_BA that includes a device ID PD_ID of the peripheral device 400-*i* and a buffer size B_SIZE. The buffer size B_SIZE may represent a size of memory that is required for the peripheral device 400-*i* to perform the DMA operation.

When the control unit 200 receives the buffer allocation control signal CON_BA including the device ID PD_ID and the buffer size B_SIZE from the central processing unit 100, the control unit 200 may allocate a buffer space having a size of the buffer size B_SIZE in a sub virtual address space that is assigned to the peripheral device 400-*i* of the device ID PD_ID. In addition, as illustrated in FIG. 2, the control unit 200 may allocate a DMA buffer having a size of the buffer size B_SIZE in the page mapping memory 320 by combining free spaces, which are not currently allocated as the DMA buffer, in the page mapping memory 320. In addition, the control unit 200 may generate a third data structure DS3, as illustrated in FIG. 8, and store a start address VA_S of the allocated buffer space and the buffer size B_SIZE in the generated third data structure DS3. The control unit 200 may detect a first data structure DS1 that stores the device ID PD_ID included in the buffer allocation control signal CON_BA, store a pointer indicating the detected first data structure DS1 in the third data structure DS3 as a second pointer DS1_P, and store a pointer indicating the generated third data structure DS3 in the detected first data structure DS1 as the first pointer DS2_P. As such, the detected first data structure DS1 and the generated third data structure DS3 may be correlated with each other.

A plurality of DMA buffers may be allocated for one peripheral device, such that a plurality of third data structures DS3 may be generated for the one peripheral device. In this case, the first data structure DS1 corresponding to the one peripheral device may store all the first pointers DS2_P indicating the plurality of third data structures DS3.

As illustrated in FIG. 8, the third data structure DS3 may further store an access bitmap A_BM. Bits of the access bitmap A_BM may correspond to the plurality of peripheral devices 400-1~400-*n*, respectively. Each bit of the access bitmap A_BM may represent whether a corresponding peripheral device accessed a DMA buffer related to the third data structure DS3 at least one time. The control unit 200 may initially set all bits of the access bitmap A_BM as a first value when the control unit 200 generates the third data structure DS3. The first value may be the For example, the access bitmap A_BM of FIG. 8 represents that first, second and fifth peripheral devices accessed the DMA buffer related to the third data structure DS3 at least one time, and third, fourth and sixth peripheral devices did not access the DMA buffer related to the third data structure DS3 at all.

In addition, as illustrated in FIG. 2, the control unit 200 may update an entry of the page table 310 that corresponds to the allocated buffer space with a physical address of the allocated DMA buffer. As such, the generated third data structure DS3 storing the start address VA_S of the allocated buffer space and the buffer size B_SIZE may be related to the allocated DMA buffer.

The control unit 200 may provide the start address VA_S of the allocated buffer space to the central processing unit 100.

In some example embodiments, when the control unit 200 receives the buffer allocation control signal CON_BA including the device ID PD_ID and the buffer size B_SIZE from the central processing unit 100, the control unit 200 may determine whether a maximum address space that is continuous and is not allocated as the buffer space in a sub virtual address space assigned to the peripheral device 400-*i* of the device ID PD_ID is smaller than the buffer size B_SIZE. If the maximum address space is smaller than the buffer size B_SIZE, the control unit 200 may provide a buffer allocation fail signal BA_F to the central processing unit 100 without allocating a DMA buffer in the page mapping memory 320.

When the central processing unit 100 receives the start address VA_S of the allocated buffer space from the control unit 200, the central processing unit 100 may provide the peripheral device 400-*i* with a first operation control signal CON_OP1 that includes the start address VA_S of the allocated buffer space that is received from the control unit 200 and the buffer size B_SIZE that represents a size of the allocated buffer space.

When the peripheral device 400-*i* receives the first operation control signal CON_OP1 including the start address VA_S of the allocated buffer space and the buffer size B_SIZE from the central processing unit 100, the memory management unit 410-*i* included in the peripheral device 400-*i* may determine whether virtual addresses, which starts from the start address VA_S included in the first operation control signal CON_OP1 and has a size of the buffer size B_SIZE included in the first operation control signal CON_OP1, exceeds the corresponding sub virtual address space using the start address S_VA_S and the size S_SIZE stored in the register unit 420-*i*.

If the virtual addresses, which starts from the start address VA_S included in the first operation control signal CON_OP1 and has a size of the buffer size B_SIZE included in the first operation control signal CON_OP1, does not exceed the corresponding sub virtual address space, the memory management unit 410-*i* included in the peripheral device 400-*i* may perform a DMA operation on the system memory unit 300 using a virtual address space, which starts from the start address VA_S included in the first operation control signal CON_OP1 and has a size of the buffer size B_SIZE included in the first operation control signal CON_OP1. The virtual address space may equal to the allocated buffer space. That is, the memory management unit 410-*i* included in the peripheral device 400-*i* may translate virtual addresses included in the virtual address space (that is, the allocated buffer space) into physical addresses using the corresponding translation lookaside buffer 411-*i* and the page table 310, and performs a write operation and a read operation on a DMA buffer corresponding to the translated physical addresses. The method of translating the virtual addresses into the physical addresses using the corresponding translation lookaside buffer 411-*i* and the page table 310 may be implemented in various ways.

If the virtual addresses, which starts from the start address VA_S included in the first operation control signal CON_OP1 and has a size of the buffer size B_SIZE included in the first operation control signal CON_OP1, exceeds the corresponding sub virtual address space, the peripheral device 400-*i* may provide an operation fail signal OP_F to the central processing unit 100 as an interrupt signal without performing the DMA operation.

When the peripheral device 400-*i* completes the DMA operation, the central processing unit 100 may command the peripheral device 400-*j* to perform a DMA operation on the system memory unit 300 using the allocated buffer space and the allocated DMA buffer, which are used by the peripheral device 400-*i*, before releasing the allocated DMA buffer. For this operation, the central processing unit 100 may provide the control unit 200 with a buffer share control signal CON_BS that includes a device ID PD_ID of the peripheral device 400-*j* and the start address VA_S of the allocated buffer space, which corresponds to the allocated DMA buffer and is allocated in a sub virtual address space that is assigned to the peripheral device 400-*i*. The start address VA_S included in the buffer share control signal CON_BS may be the same as the start address VA_S included in the first operation control signal CON_OP1 that is provided to the peripheral device 400-*i*.

When the control unit 200 receives the buffer share control signal CON_BS including the device ID PD_ID of the peripheral device 400-*j* and the start address VA_S from the central processing unit 100, the control unit 200 may detect a third data structure DS3 that stores the start address VA_S included in the buffer share control signal CON_BS, and determine whether a bit corresponding to the peripheral device 400-*j* of the device ID PD_ID included in the buffer share control signal CON_BS among bits of the access bitmap A_BM that is stored in the detected third data structure DS3 has the first value.

If the bit corresponding to the peripheral device 400-*j* among bits of the access bitmap A_BM has the first value, it represents that it is the first time for the peripheral device 400-*j* to access the allocated DMA buffer related to the detected third data structure DS3. In this case, the control unit 200 may change the bit of the access bitmap A_BM to a second value and provide an invalidation signal INV to the peripheral device 400-*j* of the device ID PD_ID. For example, the second value may be '1'. The memory management unit 410-*j* included in the peripheral device 400-*j* that receives the invalidation signal INV from the control unit 200 may invalidate all entries of the corresponding translation lookaside buffer 411-*j*.

If the bit corresponding to the peripheral device 400-*j* among bits of the access bitmap A_BM has the second value, it represents that the peripheral device 400-*j* accessed the allocated DMA buffer related to the detected third data structure DS3 at least one time. In this case, it is not required for the peripheral device 400-*j* to invalidate the corresponding translation lookaside buffer 411-*j* since the corresponding translation lookaside buffer 411-*j* already stores address translation information of the allocated DMA buffer. Therefore, the control unit 200 may not provide the invalidation signal INV to the peripheral device 400-*j* of the device ID PD_ID.

After that, the central processing unit 100 may provide the peripheral device 400-*j* with a second operation control signal CON_OP2 that includes the start address VA_S of the allocated buffer space, which corresponds to the allocated DMA buffer and is allocated in a sub virtual address space that is assigned to the peripheral device 400-*i*, and the buffer size B_SIZE that represents a size of the allocated buffer space.

When the peripheral device 400-*j* receives the second operation control signal CON_OP2 including the start address VA_S and the buffer size B_SIZE from the central processing unit 100, the memory management unit 410-*j* included in the peripheral device 400-*j* may perform a DMA operation on the system memory unit 300 using a virtual address space, which starts from the start address VA_S included in the second operation control signal CON_OP2 and has a size of the buffer size B_SIZE included in the second operation control signal CON_OP2. The virtual address space equals to the allocated buffer space. That is, the memory management unit 410-*j* included in the peripheral device 400-*j* may translate virtual addresses included in the virtual address space (that is, the allocated buffer space) into physical addresses using the corresponding translation lookaside buffer 411-*j* and the page table 310, and performs a write operation and a read operation on the allocated DMA buffer corresponding to the translated physical addresses.

As described above, when the peripheral device 400-*j* receives the second operation control signal CON_OP2 including the start address VA_S and the buffer size B_SIZE from the central processing unit 100, the peripheral device 400-*j* may perform the DMA operation on the system memory unit 300 using virtual addresses included in a sub virtual address space assigned to other peripheral devices. Therefore, the peripheral device 400-*j* may perform the DMA operation without determining whether virtual addresses, which starts from the start address VA_S included in the second operation control signal CON_OP2 and has a size of the buffer size B_SIZE included in the second operation control signal CON_OP2, exceeds the corresponding sub virtual address space using the start address S_VA_S and the size S_SIZE stored in the register unit 420-*j*. That is, the peripheral device 400-*j* may perform the DMA operation regardless of whether the virtual addresses exceed the corresponding sub virtual address space. The peripheral device 400-*j* may not provide an operation fail signal OP_F to the central processing unit 100 although the virtual addresses exceed the corresponding sub virtual address space.

When all peripheral devices that share the allocated DMA buffer complete the DMA operation, the central processing unit 100 may provide the control unit 200 with a buffer release control signal CON_BR that includes the start address VA_S of the allocated buffer space corresponding to the allocated DMA buffer. As described above, the allocated buffer space may be included in a sub virtual address space assigned to the peripheral device 400-*i*.

When the control unit 200 receives the buffer release control signal CON_BR including the start address VA_S from the central processing unit 100, the control unit 200 may detect a third data structure DS3 that stores the start address VA_S included in the buffer release control signal CON_BR, and releases a DMA buffer related to the detected third data structure DS3 from the page mapping memory 320. In addition, the control unit may delete an entry of the page table 310 that corresponds to the detected third data structure DS3. And then, the control unit 200 may provide the invalidation signal INV to the peripheral device 400-*i*, which is assigned to a sub virtual address space that includes a virtual address corresponding to the detected third data structure DS3, among the plurality of peripheral devices 400-1~400-*n*. For example, the control unit 200 may detect a first data structure DS1 that is indicated by a second pointer DS1_P stored in the detected third data structure DS3, and provide the invalidation signal INV to a peripheral device corresponding to a device ID stored in the detected first structure DS1. And then, the control unit 200 may delete the detected third data structure DS3.

The memory management unit 410-*i* included in the peripheral device 400-*i* that receives the invalidation signal INV from the control unit 200 may invalidate all entries of the corresponding translation lookaside buffer 411-*i*.

As described above, the application processor 30 according to at least one example embodiment includes only one page table 310 in the system memory unit 300, and the plurality of peripheral devices 400-1, NV from t included in the application processor 30 share the one page table 310 to perform a DMA operation. Therefore, the application processor 30 may reduce system memory consumption for storing page tables.

In addition, when the control unit 200 deletes an entry of the page table 310, the control unit 200 may provide the invalidation signal INV only to a peripheral device, which is assigned to a sub virtual address space that includes a virtual address corresponding to the deleted entry, among the plurality of peripheral devices 400-1~400-*n*, and the memory management unit included in the peripheral device that receives the invalidation signal INV from the control unit 200 may invalidate all entries of the corresponding translation lookaside buffer. The peripheral device that does not receive the invalidation signal INV from the control unit 200 may not invalidate the corresponding translation lookaside buffer. Therefore, an operation speed of the application processor 30 may not be degraded even if the plurality of peripheral devices 400-1~400-*n* included in the application processor 30 share the one page table 310 since the peripheral device that does not receive the invalidation signal INV from the control unit 200 may maintain information stored in the corresponding translation lookaside buffer after an entry of the page table 310 is deleted.

In addition, the application processor 30 may allow the plurality of peripheral devices 400-1~400-*n* to share the sub virtual address spaces that are assigned to other peripheral devices. For example, when a movie decoder performs a DMA operation in which the movie decoder decodes multimedia data to generate decoded data, and stores the decoded data in a DMA buffer, a display driver may use the DMA buffer, which stores the decoded data, as a frame buffer to perform a DMA operation. Therefore, it is not required for the application processor 30 to allocate a DMA buffer and to release the DMA buffer whenever the application processor 30 commands a peripheral device to perform a DMA operation. As such, an operation speed of the application processor 30 may further increase.

In some example embodiments, the application processors 10, 20 and 30 may be implemented as a system-on-chip.

Figure 10:
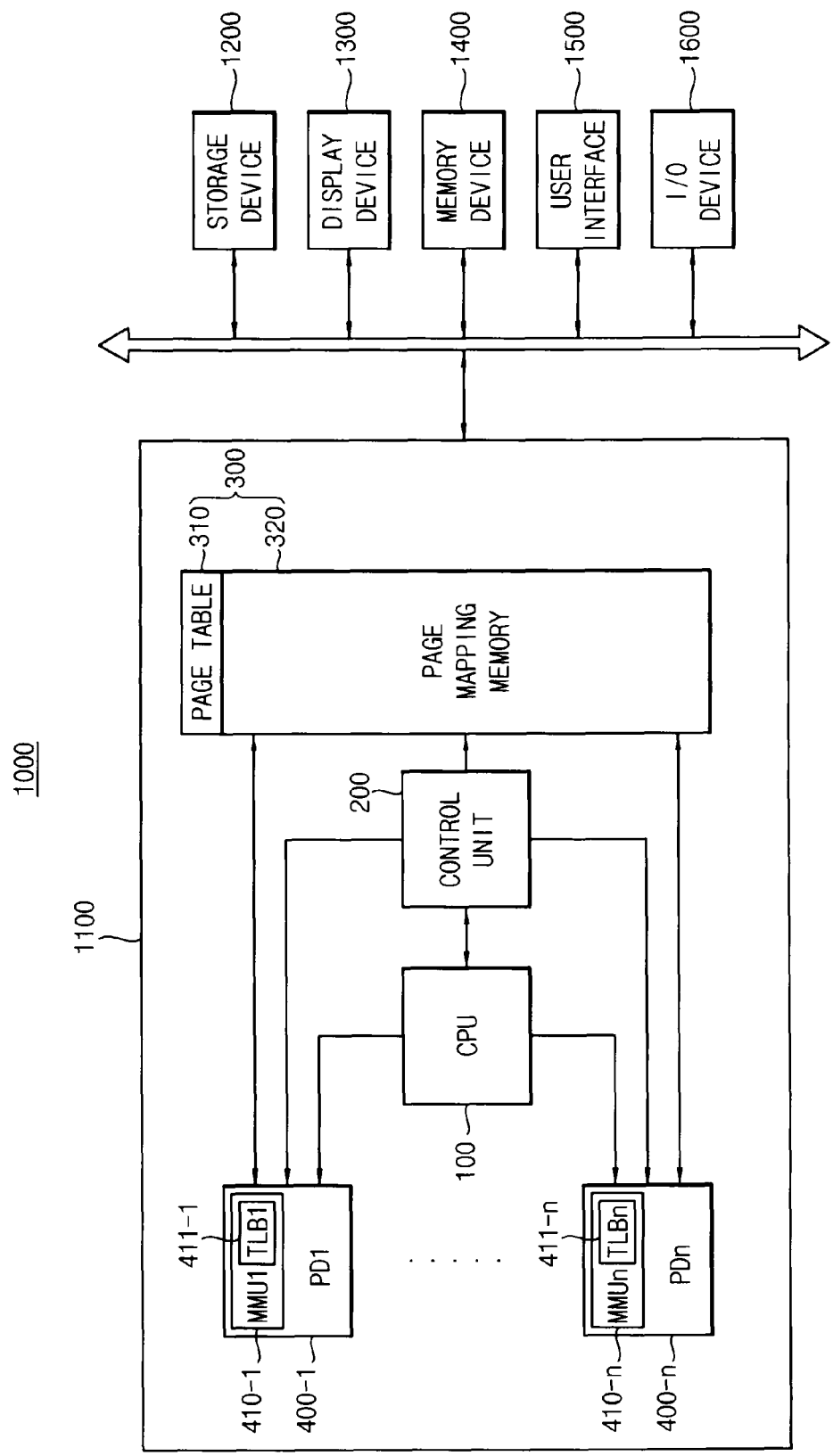
FIG. 10 is a block diagrams illustrating a computing system according to at least one example embodiment.

FIG. 10 is a block diagrams illustrating a system according to at least one example embodiment.

Referring to FIG. 10, a computing system 1000 includes an application processor 1100, a storage device 1200 and a display device 1300.

The storage device 1200 stores multimedia data. The storage device 1200 may include a solid state drive (SSD), a hard disk drive (HDD), a compact disk read-only memory (CD-ROM) drive, etc.

The application processor 1100 translates the multimedia data stored in the storage device 1200 into output data. The application processor 1100 may perform various computing functions, such as executing specific software for performing specific calculations or tasks. The application processor 1100 may be connected to the storage device 1200 and the display device 1300 via bus such as an address bus, a control bus or a data bus, etc. The application processor 1100 may be connected to an extended bus, such as peripheral component interconnect (PCI) bus.

As illustrated in FIG. 10, the application processor 1100 may be implemented with one of the application processor 10 of FIG. 1, the application processor 20 of FIG. 6 and the application processor 30 of FIG. 7. A structure and an operation of the application processors 10, 20 and 30 are described above with reference to FIGS. 1 to 9. Therefore, a detail description of the application processor 1100 of FIG. 10 will be omitted.

The display device 1300 displays the output data provided from the application processor 1100. The display device 1300 may include any type of devices such as an organic light emitting display (OLED) device, a liquid crystal display (LCD) device, etc.

The computing system 1000 may further include a memory device 1400, a user interface 1500, and an input/output device 1600. Although not illustrated in FIG. 10, the computing system 1000 may further include ports to communicate with a video card, a sound card, a memory card, a universal serial bus (USB) device, etc.

The memory device 1400 may store data for operations of the computing system 1000. For example, the memory device 1400 may include at least one volatile memory device such as a dynamic random access memory (DRAM) device, a static random access memory (SRAM) device, etc. and/or at least one non-volatile memory device such as an erasable programmable read-only memory (EPROM) device, an electrically erasable programmable read-only memory (EEPROM) device, a flash memory device, etc.

The user interface 1500 may include devices required for a user to control the computing system 1000. The input/output device 1600 may include at least one input device (e.g., a keyboard, keypad, a mouse, a touch screen, etc.) and/or at least one output device (e.g., a printer, a speaker, etc.).

The computing system 1000 may comprise any of several types of electronic devices, such as a mobile device, a smart phone, a cellular phone, a personal digital assistant (PDA), a desktop computer, a laptop computer, a work station, a handheld device, a personal media player (PMP), a digital camera, or the like.

The foregoing is illustrative of the present inventive concept and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An application processor, comprising:
a system memory unit including one page table;
a plurality of peripheral devices configured to share the page table and to perform a write operation and a read operation on the system memory unit using the page table, each of the plurality of peripheral devices including a memory management unit (MMU) having a translation lookaside buffer (TLB) configured to store a virtual address and a physical address corresponding to the virtual address;
a control unit configured to divide a total virtual address space corresponding to the page table into a plurality of sub virtual address spaces, to assign the plurality of sub virtual address spaces to the plurality of peripheral devices, respectively, to allocate a DMA (Direct Memory Access) buffer in the system memory unit, to release the DMA buffer from the system memory unit, and to update the page table, at least two of the plurality of sub virtual address spaces having different sizes from each other; and
a central processing unit configured to control the plurality of peripheral devices and the control unit.

2. The application processor of claim 1, wherein the control unit is configured such that when the control unit deletes an entry of the page table, the control unit provides an invalidation signal only to a peripheral device that is assigned to a sub virtual address space that includes a virtual address corresponding to the deleted entry, among the plurality of peripheral devices, and
wherein each memory management unit of the plurality of peripheral devices is configured such that the memory management unit included in the peripheral device that receives the invalidation signal from the control unit invalidates the corresponding translation lookaside buffer.

3. The application processor of claim 1, wherein the control unit is configured to store start addresses and sizes of the plurality of sub virtual address spaces along with corresponding device identifications (IDs) of the plurality of peripheral devices assigned to the plurality of sub virtual address spaces, respectively.

4. The application processor of claim 1, wherein the control unit is configured such that when the control unit receives a buffer allocation control signal including a device ID and a buffer size from the central processing unit, the control unit allocates a buffer space of the buffer size in a sub virtual address space assigned to a peripheral device of the device ID, allocates a DMA buffer of the buffer size in the system memory unit, generates a data structure that is related to the DMA buffer and stores a start address of the buffer space and the buffer size, updates an entry of the page table corresponding to the buffer space with a physical address of the DMA buffer, and provides the start address of the buffer space to the central processing unit.

5. The application processor of claim 4, wherein the control unit is configured to provide a buffer allocation fail signal to the central processing unit when a maximum address space that is continuous and is not allocated as the buffer space in the sub virtual address space assigned to the peripheral device of the device ID is smaller than the buffer size.

6. The application processor of claim 4, wherein the control unit is configured such that when the control unit receives a buffer release control signal including a start address from the central processing unit, the control unit detects a data structure that stores the start address included in the buffer release control signal, releases a DMA buffer related to the detected data structure from the system memory unit, deletes an entry of the page table corresponding to the detected data structure, provides an invalidation signal to a peripheral device, which is assigned to a sub virtual address space that includes a virtual address corresponding to the detected data structure, among the plurality of peripheral devices, and deletes the detected data structure.

7. The application processor of claim 6, wherein the memory management unit included in the peripheral device that receives the invalidation signal from the control unit is configured to invalidate the corresponding translation lookaside buffer.

8. The application processor of claim 4, wherein the control unit is configured such that the generated data structure further stores an access bitmap, bits of the access bitmap corresponding to the plurality of peripheral devices, respectively, each bit of the access bitmap representing whether a corresponding peripheral device accessed a DMA buffer related to the data structure at least one time, and
wherein the control unit is configured to initially sets all bits of the access bitmap as a first value when the control unit generates the data structure.

9. The application processor of claim 8, wherein the control unit is configured such that when the control unit receives a buffer share control signal including a device ID and a start address from the central processing unit, the control unit detects a data structure that stores the start address included in the buffer share control signal, and if a bit corresponding to a peripheral device of the device ID among bits of the access bitmap that is stored in the detected data structure has the first value, the control unit changes the bit to a second value and provides an invalidation signal to the peripheral device of the device ID.

10. The application processor of claim 1, wherein the plurality of peripheral devices are configured such that when each of the plurality of peripheral devices receives a first operation control signal including a start address and a buffer size from the central processing unit, the memory management unit included in each of the plurality of peripheral devices translates virtual addresses, which start from the start address included in the first operation control signal and correspond to a space that has a size of the buffer size included in the first operation control signal, into physical addresses using the corresponding translation lookaside buffer and the page table and performs the write operation and the read operation on a DMA buffer corresponding to the physical addresses.

11. The application processor of claim 10, wherein each of the plurality of peripheral devices further includes a register storing a start address and a size of a corresponding sub virtual address space.

12. The application processor of claim 11, wherein the control unit and the plurality of peripheral devices are configured such that each of the plurality of peripheral devices receives the start address and the size of the corresponding sub virtual address space from the control unit at a boot time, and stores the start address and the size of the corresponding sub virtual address space to the register.

13. The application processor of claim 11, wherein each of the plurality of peripheral devices is configured to determine whether a space corresponding to the virtual addresses, which starts from the start address included in the first operation control signal and has a size of the buffer size included in the first operation control signal, exceed the corresponding sub virtual address space using the register, and provide an operation fail signal to the central processing unit without performing the write operation and the read operation if the virtual addresses exceeds the corresponding sub virtual address space.

14. The application processor of claim 11, wherein the plurality of peripheral devices is configured such that when each of the plurality of peripheral devices receives a second operation control signal including a start address and a buffer size from the central processing unit, the memory management unit included in each of the plurality of peripheral devices translates virtual addresses, which start from the start address included in the second operation control signal and correspond to a space having a size of the buffer size included in the second operation control signal, into physical addresses using the corresponding translation lookaside buffer and the page table and performs the write operation and the read operation on a DMA buffer corresponding to the physical addresses regardless of whether the virtual addresses exceed the corresponding sub virtual address space.

15. A computing system, comprising:
a storage device configured to store multimedia data;
an application processor configured to translate the multimedia data into output data; and
a display device configured to display the output data,
wherein the application processor includes
a system memory unit including one page table;
a plurality of peripheral devices configured to share the page table and to perform a write operation and a read operation on the system memory unit using the page table, each of the plurality of peripheral devices including a memory management unit (MMU) having a translation lookaside buffer (TLB) that stores a virtual address and a physical address corresponding to the virtual address;
a control unit configured to divide a total virtual address space corresponding to the page table into a plurality of sub virtual address spaces, to assign the plurality of sub virtual address spaces to the plurality of peripheral devices, respectively, to allocate a direct memory access (DMA) buffer in the system memory unit, to release the DMA buffer from the system memory unit, and to update the page table, at least two of the plurality of sub virtual address spaces having different sizes from each other; and
a central processing unit configured to control the plurality of peripheral devices and the control unit.

16. An application processor, comprising:
a system memory unit including one page table, the page table storing virtual addresses each corresponding to physical addresses of memory in the system memory unit;
a plurality of peripheral devices configured to share the page table;
a control unit configured to divide a total virtual address space corresponding to the page table into a plurality of sub virtual address spaces, and to assign the plurality of sub virtual address spaces to the plurality of peripheral devices, respectively; and
a central processing unit configured to control the plurality of peripheral devices and the control unit,
the control unit being configured to receive buffer allocation commands corresponding to the plurality of peripheral devices from the central processing unit, allocate buffer spaces for the peripheral devices in the system memory unit based on the buffer allocation commands in accordance with the sub virtual address spaces corresponding, respectively, to the peripheral devices, update the page table to reflect the allocated buffer spaces, and provide virtual start addresses corresponding to each of the allocated buffer spaces to the central processing unit,
the peripheral memory devices being configured receive corresponding ones of the virtual start addresses from the central processing unit and to perform a memory read or write operations on the system memory unit based on the virtual start addresses and the page table.

17. The application processor of claim 16, wherein each of the plurality of peripheral devices includes a memory management unit (MMU) having a translation lookaside buffer (TLB) configured to translate the virtual start address into a physical addresses of the system memory unit.

18. The application processor of claim 16, wherein the control unit is configured to divide the total virtual address space such that at least two of the plurality of sub virtual address spaces have different sizes from each other.

19. The application processor of claim 16, wherein the control unit is further configured to receive buffer release commands from the central processing unit, the buffer release commands indicating peripheral devices from among the plurality of peripheral devices, and to release spaces from among the buffer spaces allocated to the indicated peripheral devices based on the buffer release commands by sending invalidation commands to the TLBs of the indicated peripheral devices.

* * * * *